US008617289B2

(12) United States Patent
Lockstedt et al.

(10) Patent No.: US 8,617,289 B2
(45) Date of Patent: Dec. 31, 2013

(54) HARDFACING COMPOSITIONS FOR EARTH BORING TOOLS

(75) Inventors: Alan W. Lockstedt, Magnolia, TX (US); Gregory T. Lockwood, Pearland, TX (US)

(73) Assignee: Smith International, Inc., Houston, TX (US)

(*) Notice: Subject to any disclaimer, the term of this patent is extended or adjusted under 35 U.S.C. 154(b) by 1138 days.

(21) Appl. No.: 12/190,002

(22) Filed: Aug. 12, 2008

(65) Prior Publication Data

US 2010/0038145 A1 Feb. 18, 2010

(51) Int. Cl.
*B22F 1/00* (2006.01)
*C22C 29/08* (2006.01)
*E21B 10/08* (2006.01)
*E21B 10/42* (2006.01)

(52) U.S. Cl.
USPC ............. 75/252; 75/236; 75/240; 175/375; 175/425

(58) Field of Classification Search
USPC ............ 75/240, 252, 236; 175/375, 435
See application file for complete search history.

(56) References Cited

U.S. PATENT DOCUMENTS

| 3,379,503 | A |   | 4/1968  | McKenna |
|-----------|---|---|---------|---------|
| 4,723,996 | A |   | 2/1988  | Brunet et al. |
| 4,781,770 | A |   | 11/1988 | Kar |
| 4,834,963 | A |   | 5/1989  | Terry et al. |
| 5,089,182 | A |   | 2/1992  | Findeisen et al. |
| 5,501,112 | A |   | 3/1996  | Bernstein et al. |
| 5,535,838 | A |   | 7/1996  | Keshavan et al. |
| 5,541,006 | A |   | 7/1996  | Conley |
| 5,967,248 | A | * | 10/1999 | Drake et al. ............... 175/425 |
| 5,988,302 | A | * | 11/1999 | Sreshta et al. ............. 175/374 |
| 6,124,564 | A |   | 9/2000  | Sue et al. |
| 6,248,149 | B1| * | 6/2001  | Massey et al. ............. 75/236 |
| 6,287,360 | B1|   | 9/2001  | Kembaiyan et al. |
| 6,615,936 | B1|   | 9/2003  | Mourik et al. |
| 6,780,458 | B2|   | 8/2004  | Seth et al. |
| 6,908,688 | B1|   | 6/2005  | Majagi et al. |
| 2008/0149397 | A1 |   | 6/2008 | Overstreet |

OTHER PUBLICATIONS

Declaration of Greory T. Lockwood with Appedix A, B and C dated Jul. 8, 2013 (14 pages).

* cited by examiner

*Primary Examiner* — Roy King
*Assistant Examiner* — Ngoclan T Mai
(74) *Attorney, Agent, or Firm* — Osha Liang LLP

(57) ABSTRACT

A hardfacing composition essentially consisting of from about 50 to 75 percent by weight of a carbide phase having a particle size distribution of ±20% or less of a median particle size; and from about 25 to 50 percent by weight of binder phase is disclosed. Drill bits having such hardfacing compositions disposed thereon are also disclosed.

24 Claims, 2 Drawing Sheets

HARDFACING COMPOSITIONS FOR EARTH BORING TOOLS

BACKGROUND OF INVENTION

1. Field of the Invention

Embodiments disclosed herein relate generally to compositions which provide improved hardfacing materials for use in drill bits or other earth boring cutting tools.

2. Background Art

Historically, there have been two types of drill bits used drilling earth formations, drag bits and roller cone bits. Roller cone bits include one or more roller cones rotatably mounted to the bit body. These roller cones have a plurality of cutting elements attached thereto that crush, gouge, and scrape rock at the bottom of a hole being drilled. Several types of roller cone drill bits are available for drilling wellbores through earth formations, including insert bits (e.g. tungsten carbide insert bit, TCI) and "milled tooth" bits. The bit bodies and roller cones of roller cone bits are conventionally made of steel. In a milled tooth bit, the cutting elements or teeth are steel and conventionally integrally formed with the cone. In an insert or TCI bit, the cutting elements or inserts are conventionally formed from tungsten carbide, and may optionally include a diamond enhanced tip thereon.

The term "drag bits" refers to those rotary drill bits with no moving elements. Drag bits are often used to drill a variety of rock formations. Drag bits include those having cutting elements or cutters attached to the bit body, which may be a steel bit body or a matrix bit body formed from a matrix material such as tungsten carbide surrounded by an binder material. The cutters may be formed having a substrate or support stud made of carbide, for example tungsten carbide, and an ultra hard cutting surface layer or "table" made of a polycrystalline diamond material or a polycrystalline boron nitride material deposited onto or otherwise bonded to the substrate at an interface surface.

Typically, a hardfacing material is applied, such as by arc or gas welding, to the exterior surface of the steel components (e.g., milled teeth or steel bit body) to improve the wear resistance of the area of the bit (or other downhole tools needing body protection. The hardfacing material typically includes one or more metal carbides, which are bonded to the steel components by a metal alloy ("binder alloy"). In effect, the carbide particles are suspended in a matrix of metal forming a layer on the surface of the steel. The carbide particles give the hardfacing material hardness and wear resistance, while the matrix metal provides fracture toughness to the hardfacing.

Many factors affect the durability of a hardfacing composition in a particular application. These factors include the chemical composition and physical structure (size and shape) of the carbides, the chemical composition and microstructure of the matrix metal or alloy, and the relative proportions of the carbide materials to one another and to the matrix metal or alloy. The metal carbide most commonly used in hardfacing is tungsten carbide. Small amounts of tantalum carbide and titanium carbide may also be present in such material, although these other carbides may be considered to be deleterious.

Many different types of tungsten carbides are known based on their different chemical compositions and physical structure. Three types of tungsten carbide commonly typically used in hardfacing drill bits are cast tungsten carbide, macro-crystalline tungsten carbide, carburized tungsten carbide, and cemented tungsten carbide (also known as sintered tungsten carbide).

Cemented tungsten carbide refers to a material formed by mixing particles of tungsten carbide, typically monotungsten carbide, and particles of cobalt or other iron group metal, and sintering the mixture. In a typical process for making cemented tungsten carbide, small tungsten carbide particles, e.g., 1-15 microns, and cobalt particles are vigorously mixed with a small amount of organic wax which serves as a temporary binder. An organic solvent may be used to promote uniform mixing. The mixture may be prepared for sintering by forming the mixture into granules or particles such as by pressing through a screen, or tumbling and then screened to obtain more or less uniform particle size.

Such green particles are then heated in a vacuum furnace to first evaporate the wax and then to a temperature near the melting point of cobalt (or the like) to cause the tungsten carbide particles to be bonded together by the metallic phase. After sintering, the compacts are crushed and screened for the desired particle size. Similarly, the sintered particles, which tend to bond together during sintering, are gently churned in a ball mill with media to separate them without damaging the particles. Some particles may be crushed to break them apart. These are also screened to obtain a desired particle size. The crushed cemented carbide is generally more angular than the particles which tend to be rounded.

Another type of tungsten carbide is macro-crystalline carbide. This material is essentially stoichiometric tungsten carbide created by a thermite process. Most of the macro-crystalline tungsten carbide is in the form of single crystals, but some bicrystals of tungsten carbide may also form in larger particles. Single crystal stoichiometric tungsten carbide is commercially available from Kennametal, Inc., Fallon, Nev.

Carburized carbide is yet another type of tungsten carbide. Carburized tungsten carbide is a product of the solid-state diffusion of carbon into tungsten metal at high temperatures in a protective atmosphere. Sometimes, it is referred to as fully carburized tungsten carbide. Such carburized tungsten carbide grains usually are multi-crystalline, i.e., they are composed of tungsten carbide agglomerates. The agglomerates form grains that are larger than the individual tungsten carbide crystals. These large grains make it possible for a metal infiltrant or an infiltration binder to infiltrate a powder of such large grains. On the other hand, fine grain powders, e.g., grains less than 5 µm, do not infiltrate satisfactorily. Typical carburized tungsten carbide contains a minimum of 99.8% by weight of tungsten carbide, with a total carbon content in the range of about 6.08% to about 6.18% by weight.

Regardless of the type of hardfacing material used, designers continue to seek improved properties (such as improved wear resistance, thermal resistance, etc.) in the hardfacing materials. Unfortunately, increasing wear resistance usually results in a loss in toughness, or vice-versa.

Accordingly, there exists a continuing need for improvements in hardfacing materials.

SUMMARY OF INVENTION

In one aspect, embodiments disclosed herein relate to a hardfacing composition essentially consisting of from about 50 to 75 percent by weight of a carbide phase having a particle size distribution of ±20% or less of a median particle size; and from about 25 to 50 percent by weight of binder phase.

In another aspect, embodiments disclosed herein relate to a hardfacing composition essentially consisting of from about 50 to 75 percent by weight of a carbide phase, wherein 90% of the carbide phase have a particle size within 20% or less of a median particle size of the carbide phase; and from about 25 to 50 percent by weight of binder phase.

In another aspect, embodiments disclosed herein relate to a roller cone drill bit that includes a bit body; and at least one roller cone rotatably mounted to the bit body, the at least one roller cone comprising at least one cutting element, the at least one cutting element having a hardfacing composition on at least an exterior surface, the hardfacing composition consisting essentially of: a plurality of carbide particles having a particle size distribution of ±20% or less of a median particle size; and a binder phase.

In yet another aspect, embodiments disclosed herein relate to a roller cone drill bit that includes a bit body; and at least one roller cone rotatably mounted to the bit body, the at least one roller cone comprising at least one cutting element, the at least one cutting element having a hardfacing on at least an exterior surface, the hardfacing comprising a plurality of carbide particles separated by a binder phase, wherein the plurality of carbide particles have a mean free path of at least 40 microns.

In yet another embodiment, embodiments disclosed herein relate to a drill bit that includes a bit body having at least one blade thereon; at least one cutter pocket disposed on the at least one blade; at least one cutter disposed in the at least one cutter pocket; and a hardfacing disposed on at least an exterior surface of the bit body, the hardfacing composition consisting essentially of: a plurality of carbide particles having a particle size distribution of ±20% or less of a median particle size; and a binder phase.

In yet another aspect, embodiments disclosed herein relate to a drill bit that includes a bit body having at least one blade thereon; at least one cutter pocket disposed on the at least one blade; at least one cutter disposed in the at least one cutter pocket; and a hardfacing disposed on at least an exterior surface of the bit body, the hardfacing comprising a plurality of carbide particles separated by a binder phase, wherein the plurality of carbide particles have a mean free path of at least 40 microns.

Other aspects and advantages of the invention will be apparent from the following description and the appended claims.

DETAILED DESCRIPTION

Embodiments of the present disclosure provide for hardfacing compositions suitable for use on bit bodies or other earth boring tools. In addition, embodiments of the present disclosure provide hardfacing compositions which are formed from such carbide powders and a metal binder.

Figure 1:
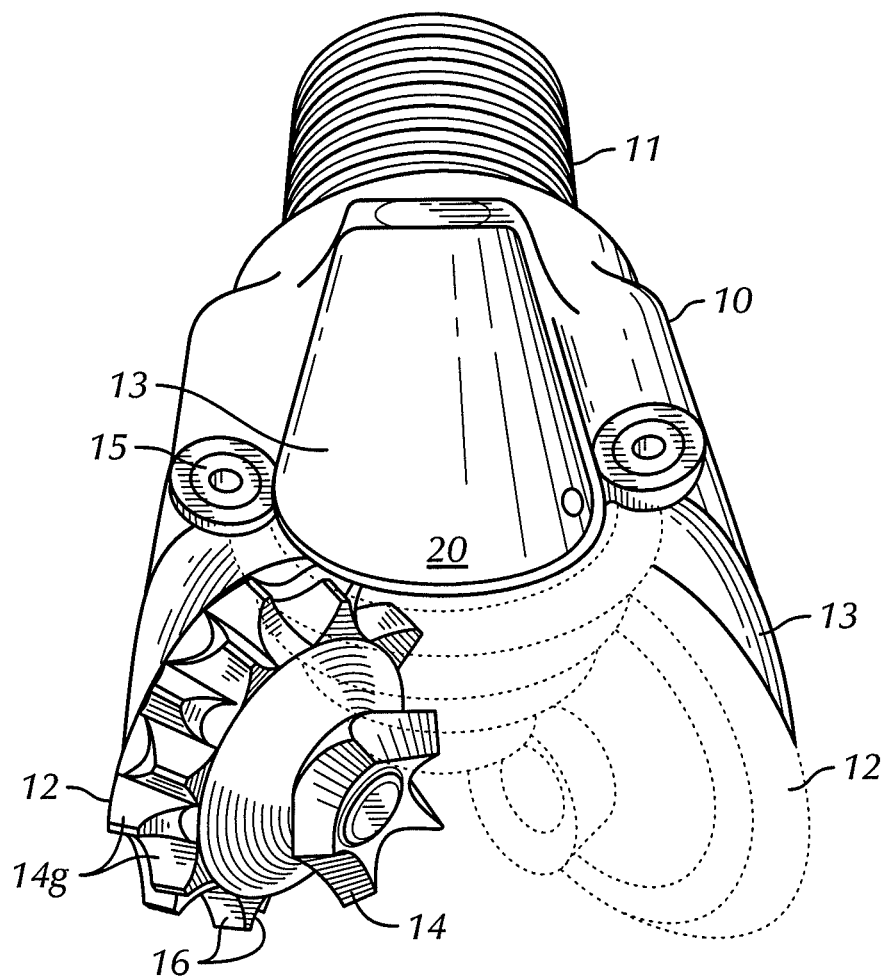
FIG. 1 shows a milled tooth roller cone rock bit in accordance with the present disclosure.

Referring to FIG. 1, an example of a milled tooth roller cone drill bit is shown. As shown, the bit includes a steel body 10 having a threaded coupling ("pin") 11 at one end for connection to a conventional drill string (not shown). At the opposite end of the drill bit body 10 are three roller cones 12, for drilling earth formations. Each of the roller cones 12 is rotatably mounted on a journal pin (not shown in FIG. 1) extending diagonally inwardly on each one of the three legs 13 extending downwardly from the bit body 10. As the bit is rotated by the drill string (not shown) to which it is attached, the roller cones 12 effectively roll on the bottom of the wellbore being drilled. The roller cones 12 are shaped and mounted so that as they roll, teeth 14 on the cones 12 gouge, chip, crush, abrade, and/or erode the earth formations (not shown) at the bottom of the wellbore. The teeth 14G in the row around the heel of the cone 12 are referred to as the "gage row" teeth. They engage the bottom of the hole being drilled near its perimeter or "gage." Fluid nozzles 15 direct drilling fluid ("mud") into the hole to carry away the particles of formation created by the drilling.

Such a roller cone rock bit as shown in FIG. 1 is conventional and is therefore merely one example of various arrangements that may be used in a rock bit in accordance with the present disclosure. For example, most roller cone rock bits have three roller cones as illustrated in FIG. 1. However, one, two and four roller cone drill bits are also known in the art. Therefore, the number of such roller cones on a drill bit is not intended to be a limitation on the scope of the invention. In addition, embodiments of the present disclosure apply equally well to drag bits.

The arrangement of the teeth 14 on the cones 12 shown in FIG. 1 is just one of many possible variations. In fact, it is typical that the teeth on the three cones on a rock bit differ from each other so that different portions of the bottom of the hole are engaged by each of the three roller cones so that collectively the entire bottom of the hole is drilled. A broad variety of tooth and cone geometries are known and do not form a specific part of this invention, nor should the invention be limited in scope by any such arrangement.

In addition, while embodiments of the present disclosure describe hardfacing teeth, embodiments of the present invention may be used to provide erosion, abrasion, or wear protection for fixed cutter bits, or other types of bits or cutting tools as known in the art. The specific descriptions provided below do not limit the scope of the invention, but rather provide illustrative examples. Those having ordinary skill in the art will appreciate that the hardfacing compositions may be used on other types of and locations on drill bits and earth boring cutting tools.

Figure 2:
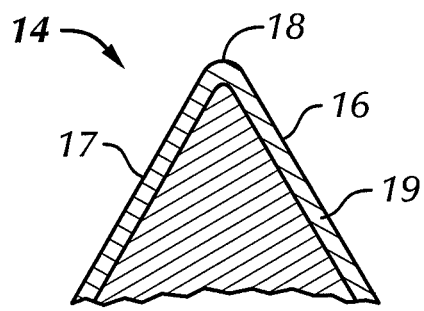
FIG. 2 shows a cross-section of a milled tooth in accordance with the present disclosure.

The example teeth on the roller cones shown in FIG. 1 are generally triangular in a cross-section taken in a radial plane of the cone. Referring to FIG. 2, such a tooth 14 has a leading flank 16 and a trailing flank 17 (determined by the direction of rotation of the bit and/or cone) meeting in an elongated crest 18. The flank of the tooth 14 is covered with a hardfacing layer 19. Sometimes only the leading face of each such tooth 14 is covered with a hardfacing layer 19 so that differential erosion, abrasion, or wear between the wear-resistant hardfacing on the front flank of a tooth and the less wear-resistant steel on the trailing face of the tooth may keep the crest of the tooth relatively sharp for enhanced penetration of the rock being drilled.

The leading flank 16 of the tooth 14 is the face that tends to bear against the undrilled rock as the rock bit is rotated in the wellbore. Because of the various cone angles of different teeth on a roller cone relative to the angle of the journal pin on which each cone is mounted, the leading flank on the teeth in one row on the same cone may face in the direction of rotation of the bit, whereas the leading flank on teeth in another row may on the same cone face away from the direction of rotation of the bit. In other cases, particularly near the axis of the bit, neither flank can be uniformly regarded as the leading flank, and both flanks may be provided with hardfacing. There are also times when the ends of a tooth, that is, the portions facing the more or less axial direction on the cone, are also provided with a layer of hardfacing. This is particularly true on the so-called gage surface of the bit which is often provided with hardfacing.

The gage surface is a generally conical surface at the heel of a cone which engages the side wall of a hole as the bit is used. The gage surface includes the outer end of teeth in the so-called gage row of teeth nearest the heel of the cone and may include additional area nearer the axis of the cone than the root between the teeth. The gage surface is not considered to include the leading and trailing flanks of the gage row teeth. The gage surface encounters the side wall of the hole in a complex scraping motion which induces wear of the gage surface. In some drill bits, hardfacing may also be applied on the shirttail (20 in FIG. 1) at the bottom of each leg on the bit body.

In various embodiments, coated particles are applied as a hardfacing as a filler in a steel tube. The hardfacing filler materials may further comprise deoxidizer and resin. When the coated particles are applied to drill bits, the coated particles may be dispersed in a matrix of alloy steel welded to the drill bits.

The invention is based, in part, on the determination that the life of a drill bit is related to bit's strength, toughness, and resistance to wear and erosion. For example, a drill bit is also subjected to varying degrees of impact and fatigue loading while drilling through earthen formations of varying hardness. It is important that the bit possesses adequate toughness to withstand such impact and fatigue loading. Additionally, during drilling processes, drilling fluids, often laden with rock cuttings, can cause erosion of the bit body. Thus, it is also important that the matrix body material be sufficiently erosion resistant to withstand degradation caused by the surrounding erosive environment.

In particular, while conventional attempts to improve the wear properties of hardfacing used wide particle size distributions to increase the packing efficiency of the wear resistant carbide particles (by filling smaller carbide particles into the spaces between larger carbide particles resulting in greater carbide-carbide particle contact), the present disclosure is instead directed to techniques for balancing toughness and wear resistance by using narrow particle size distributions. Such narrow size distributions result in better (greater and more uniform) spacing between particles, more even distribution of carbide particles throughout the binder phase, and thus less carbide-carbide particle contact. As used herein, the term "even" distribution simply means that the carbide particles are more uniformly distributed throughout the binder phase when compared with similar prior art samples.

The relative distribution of carbide particles in the binder phase of the harfacing may be measured using several different methods. For example, the carbide distribution may be discussed in terms of the mean free path, which represents the mean distance between carbide particles. In accordance with embodiments of the present disclosure, an improved mean free path may result from the particle size distributions used in forming hardfacing layers. By using a particle size distribution which results in a larger mean free path (for a given carbide concentration), a more evenly distribution of carbide particles may be obtained.

To decrease carbide-carbide contact (and increase mean free path), a better spacing between particles (less efficient packing) is desired. Thus, while conventional wisdom in hardfacing design has indicated that a wide particle size distribution is desirable to fill "pore" spaces between larger carbide particles with smaller carbide particles (increasing packing efficiency) in order to increase wear resistance, the present disclosure uses a relatively narrow particle size distribution, resulting in a lower packing efficiency. However, such narrow distribution is desirable to prevent carbide-carbide contact. When a hardfaced bit is subjected to typical loads during drilling, reduction in carbide-carbide contact may result in a hardfacing/bit less prone to cracking (and propagation of cracking). On skilled in the art would appreciate that the total range of carbide-to-carbide distances may vary; however, a mean free path may reflect the general distribution of carbides through the hardfacing layer. In accordance with one embodiment of the present disclosure, the mean free path may be greater than about 40 microns, greater than about 50 microns in another embodiment, and greater than about 60 microns in yet another embodiment. One skilled in the art would appreciate that the mean free path may depend, to some extent, on the volume of carbide particles in the total hardfacing. Thus, such mean free paths values listed above may reflect the mean free path of carbide particles where the carbide content ranges from 40 to 70 percent by volume of the total hardfacing, and from 50 to 60 percent by volume in particular embodiments. One skilled in the art would appreciate that depending on the types of particles being used (spherical or angular), a tighter packing may result, pushing the carbide volume content up to 70 percent.

Particle size distribution may be expressed as being with a certain sigma (or deviation) from a median particle size. Thus, in a particular embodiment, the particle size distribution of the hardfacing carbide composition may be within ±20%, and ±15% in another embodiment, of the median particle size. Alternatively, the hardfacing carbide composition may have 90% of the carbide particles within 20% of a median particle size, and within 15% or 10% of the median particle size in other embodiments. In yet another embodiment, the hardfacing carbide composition may have 95% of the carbide particles within 20% of a median particle size, and within 15%, 10%, 5% or 0% of the median particle size in yet other embodiments Further, carbide particles are often measured in a range of mesh sizes, for example −40+80 mesh. The term "mesh" actually refers to the size of the wire mesh used to screen the carbide particles. For example, "40 mesh" indicates a wire mesh screen with forty holes per linear inch, where the holes are defined by the crisscrossing strands of wire in the mesh. The hole size is determined by the number of meshes per inch and the wire size. The mesh sizes referred to herein are standard U.S. mesh sizes. For example, a standard 40 mesh screen has holes such that only particles having a dimension less than 420 μm can pass. Particles having a size larger than 420 μm are retained on a 40 mesh screen and particles smaller than 420 μm pass through the screen. Therefore, the range of sizes of the carbide particles is defined by the largest and smallest grade of mesh used to screen the particles. Carbide particles in the range of −16+40 mesh (i.e., particles are smaller than the 16 mesh screen but larger than the 40 mesh screen) will only contain particles larger than 420 μm and smaller than 1190 μm, whereas particles in the range of −40+80 mesh will only contain particles larger than 180 μm and smaller than 420 μm. Thus, use of mesh screening may allow for an easy determination of particle size distribution. Exemplary mesh sizes may include −230+325, −200+270, −170+230, −140+200, −120+170, −100+140, −80+120, −70+100, −60+80, −50+70. Further, one skilled in the art would appreciate that uniformly sized matrix powder may be taken from either end of the size spectrum, including fine or coarse particles. For example, in a particular embodiment, the matrix powder may have a mean particle size ranging from about 50 to about 840 microns.

Further, one skilled in the art would appreciate that wear properties may be optimized by selection of the particle or mesh size, and also by selection of tungsten carbide type. For example, it is typically observed that the wear resistance increases as the grain size of tungsten carbide decreases. Conversely, toughness typically increases as grain size increases. Moreover, among the types of tungsten carbide, some types are known as being more wear resistant than others, while the others may have greater contribution to toughness.

As discussed above, one type of tungsten carbide is macrocrystalline carbide. This material is essentially stoichiometric WC in the form of single crystals. Most of the macrocrystalline tungsten carbide is in the form of single crystals, but some bicrystals of WC may form in larger particles. The manufacture of macrocrystalline tungsten carbide is disclosed, for example, in U.S. Pat. Nos. 3,379,503 and 4,834,963, which are herein incorporated by reference.

Another form of tungsten carbide is cemented tungsten carbide (also known as sintered tungsten carbide), which is a material formed by mixing particles of tungsten carbide, typically monotungsten carbide, and cobalt particles, and sintering the mixture. Methods of manufacturing cemented tungsten carbide are disclosed, for example, in U.S. Pat. Nos. 5,541,006 and 6,908,688, which are herein incorporated by reference. Sintered tungsten carbide particles are commercially available in two basic forms: crushed and spherical (or pelletized). Crushed sintered tungsten carbide is produced by crushing sintered components into finer particles, resulting in more irregular and angular shapes, whereas pelletized sintered tungsten carbide is generally rounded or spherical in shape.

Briefly, in a typical process for making cemented tungsten carbide, a tungsten carbide powder having a predetermined size (or within a selected size range) is mixed with a suitable quantity of cobalt, nickel, or other suitable binder. The mixture is typically prepared for sintering by either of two techniques: it may be pressed into solid bodies often referred to as green compacts, or alternatively, the mixture may be formed into granules or pellets such as by pressing through a screen, or tumbling and then screened to obtain more or less uniform pellet size. Such green compacts or pellets are then heated in a controlled atmosphere furnace to a temperature near the melting point of cobalt (or the like) to cause the tungsten carbide particles to be bonded together by the metallic phase. Sintering globules of tungsten carbide specifically yields spherical sintered tungsten carbide. Crushed cemented tungsten carbide may further be formed from the compact bodies or by crushing sintered pellets or by forming irregular shaped solid bodies.

The particle size and quality of the sintered tungsten carbide can be tailored by varying the initial particle size of tungsten carbide and cobalt, controlling the pellet size, adjusting the sintering time and temperature, and/or repeated crushing larger cemented carbides into smaller pieces until a desired size is obtained. In one embodiment, tungsten carbide particles (unsintered) having an average particle size of between about 0.2 µm to about 20 µm are sintered with cobalt to form either spherical or crushed cemented tungsten carbide. In a preferred embodiment, the cemented tungsten carbide is formed from tungsten carbide particles having an average particle size of about 0.8 µm to about 5 µm. In some embodiments, the amount of cobalt present in the cemented tungsten carbide is such that the cemented carbide is comprised of from about 6 to 8 weight percent cobalt. In other embodiments, the cemented tungsten carbide used in the mixture of tungsten carbides to form a matrix bit body may have a hardness ranging from about 90 to 92 Rockwell A.

Cast tungsten carbide is another form of tungsten carbide and has approximately the eutectic composition between bitungsten carbide, $W_2C$, and monotungsten carbide, WC. Cast carbide is typically made by resistance heating tungsten in contact with carbon, and is available in two forms, crushed cast tungsten carbide and spherical cast tungsten carbide. Processes for producing spherical cast carbide particles are described in U.S. Pat. Nos. 4,723,996 and 5,089,182, which are herein incorporated by reference. Briefly, tungsten may be heated in a graphite crucible having a hole through which a resultant eutectic mixture of $W_2C$ and WC may drip. This liquid may be quenched in a bath of oil and may be subsequently comminuted or crushed to a desired particle size to form what is referred to as crushed cast tungsten carbide. Alternatively, a mixture of tungsten and carbon is heated above its melting point into a constantly flowing stream which is poured onto a rotating cooling surface, typically a water-cooled casting cone, pipe, or concave turntable. The molten stream is rapidly cooled on the rotating surface and forms spherical particles of eutectic tungsten carbide, which are referred to as spherical cast tungsten carbide.

The standard eutectic mixture of WC and $W_2C$ is typically about 4.5 weight percent carbon. Cast tungsten carbide commercially used as a matrix powder typically has a hypoeutectic carbon content of about 4 weight percent. Thus, for example, the cast tungsten carbide used in the mixture of tungsten carbides may be comprised of from about 3.7 to about 4.2 weight percent carbon.

U.S. Pat. No. 6,287,360, which is assigned to the assignee of the present invention and is herein incorporated by reference, discusses the manufacture of carburized tungsten carbide. Carburized tungsten carbide, as known in the art, is a product of the solid-state diffusion of carbon into tungsten metal at high temperatures in a protective atmosphere. Carburized tungsten carbide grains are typically multi-crystalline, i.e., they are composed of WC agglomerates. The agglomerates form grains that are larger than individual WC crystals. These larger grains make it possible for a metal infiltrant or an infiltration binder to infiltrate a powder of such large grains. On the other hand, fine grain powders, e.g., grains less than 5 µm, do not infiltrate satisfactorily. Typical carburized tungsten carbide contains a minimum of 99.8% by weight of carbon infiltrated WC, with a total carbon content in the range of about 6.08% to about 6.18% by weight. Tungsten carbide grains designated as WC MAS 2000 and 3000-5000, commercially available from H.C. Stark, are carburized tungsten carbides suitable for use in the formation of the matrix bit body disclosed herein. The MAS 2000 and 3000-5000 carbides have an average size of 20 and 30-50 micrometers, respectively, and are coarse grain conglomerates formed as a result of the extreme high temperatures used during the carburization process.

Thus, one skilled in the art would appreciate that the various tungsten carbides disclosed herein may be selected so as to provide a hardfacing that is tailored for a particular drilling application. For example, the type (e.g., cast, cemented, carburized, or macrocrystalline tungsten carbide), shape, and/or size of carbide particles used in the formation of a hardfacing may affect the material properties of the formed hardfacing layer, including, for example, fracture toughness, transverse rupture strength, and wear and erosion resistance. In a particular embodiment, either spherical or crushed cast tungsten carbide may be used in the hardfacing composition of the present disclosure. Further, while reference is made to tungsten carbide, one skilled in the art would appreciate that other carbides, borides, or nitrides of Group 4a, 5a, or 6a metals may also be used.

Thus the matrix powder may consist essentially of a mixture of tungsten carbide particles and metallic binder particles. The hard metal particles in the hardfacing are bonded to the bit body by a metal alloy ("binder alloy"), which is typically a steel or nickel alloy (depending on the location of the hardfacing). In effect, the hard metal particles are suspended in a matrix of nickel alloy forming a layer on the surface of the bit body. Thus, a hardfacing composition may have varying amounts of hard particles, with a binder alloy constituting the balance of the hardfacing. The hard metal particles give the hardfacing material hardness and wear resistance, while the matrix metal bonds the hard metal particles in place and provides some fracture toughness to the hardfacing. In a particular embodiment, the binder alloy may include a steel alloy or metals such as Co, Ni, Fe, Mn, alloys thereof, or mixtures thereof.

In one embodiment, the erosion resistant material may include about 40 to 65 percent by weight spherical cast tungsten carbide and a balance of a nickel alloy, a Ni—Cr—Si—Fe—B alloy in a particular embodiment. In another embodiment, the carbide content in the hardfacing may vary from about 50 to 75 weight percent, with a binder alloy constituting the balance of the reinforcing overlay.

In addition to the carbide/binder alloys serving as the primary components, it may also be desirable to include up to five percent by weight of deoxidizer and a temporary resin binder. A suitable deoxidizer includes silicomanganese obtained from Chemalloy in Bryn Mawr, Pa. A typical composition of the silicomanganese is 65% to 68% manganese, 15% to 18% silicon, a maximum of 2% carbon, a maximum of 0.05% sulfur, a maximum of 0.35% phosphorus, and a balance comprising iron. Preferably, about four percent deoxidizer is used. A small amount of thermoset resin is desirable for partially holding the particles together in the tube so that they do not simply fall out during welding. A half percent by weight of resin is adequate. The term "deoxidizer" as used herein refers generally to deoxidizer with or without the resin.

Application of the compositions disclosed herein may be achieved by any suitable method known in the art. Embodiments of the invention may use any suitable hardfacing technique(s) known in the art to achieve hardfacing composition variations. Prior art methods that may be used with embodiments of the invention, for example, may include atomic hydrogen welding, oxyacetylene welding, plasma transfer arc ("PTA"), pulsed plasma transfer arc ("PPTA"), gas tungsten arc, shielded metal arc process, laser cladding, d-gun, spray-and-fuse, or high velocity cold spray technique or the like.

Welding is among the oldest methods for application of hardfacing onto a drill bit or other earth boring tool. In a typical application, a welding tube is melted by an oxyacetylene or atomic hydrogen welding torch onto the surface of the metal object that is to be protected (e.g., a cutter, roller cone, or drill bit). The welding tube comprises a filler enclosed in a steel (or other alloy) tube, in which the filler mainly comprises carbide particles (or borides or nitrides) but may also comprise deoxidizer for steel, flux, or a resin binder. When melted, the steel (or other alloy) suspends the carbide particles in the hardfacing overlay and also helps to bond the hardfacing layer to the metal object. This steel (or other alloy) may be generally referred to as "matrix metal" or "binder alloy." In typical applications, the proportions of the filler to the steel tube may be adjusted by controlling the diameter and/or the thickness of the steel tube.

Some embodiments of the invention use laser cladding or plasma transferred arc to deposit hardfacing. Examples of the use of laser cladding in applying hardfacing to drill bits may be found in U.S. Pat. No. 4,781,770 issued to Kar. Examples of plasma transfer arc (PTA) techniques may be found in U.S. Pat. No. 6,615,936 issued to Mourik et al., while examples of pulsed plasma transferred arc (PPTA) may be found in U.S. Pat. No. 6,124,564 issued to Sue et al. These patents are assigned to the assignee of the present invention and are incorporated by reference in their entireties. With these techniques, energy beams, i.e., laser or plasma transferred arc, may be directed to a hardfacing composition to melt the hardfacing composition onto the substrate.

With laser cladding or plasma transferred arc techniques, the hardfacing compositions are often fed in a powder form. When using powder injection, a mixture of carbide particles (or boride or nitride particles) and a metal matrix powder may be injected into a plasma stream or an arc. Another method of feeding a hardfacing composition is by use of a wire or a rod, as disclosed in U.S. Pat. No. 5,501,112 issued to Keshavan et al. The wire or rod may be made of a hardfacing composition (i.e., a mixture). Alternatively, the wire may be made of a matrix metal, and the outside of the wire is coated with the carbide particles, or vice versa.

D-gun (detonation gun) coatings, such as, for example, those described in U.S. Pat. No. 5,535,838, which is herein incorporated by reference in its entirety, include those coatings applied by the use of a d-gun. The d-gun process includes gases, usually consisting of oxygen and a fuel gas mixture, that are fed into a barrel of the gun along with a charge of fine tungsten carbide-based powder. The gases and the resulting detonation wave heat and accelerate the powder as it moves down the barrel. The powder is entrained for a sufficient distance for it to be accelerated to a high velocity and for virtually all of the powder to become molten. A pulse of inert nitrogen gas is used to purge the barrel after each detonation. The process may be repeated many times per second. Each detonation results in the deposition of a coating material, a few microns thick on the surface of the steel. Additionally, although most coating materials are heated to temperatures well beyond their melting points, substrate temperatures generally remain very low. Thus, in various embodiments, a reinforcing overlay applied by a d-gun process may be applied either prior to or subsequent to other required thermal processes such as brazing of the cutting elements to the bit body, heat treating, carburizing, etc.

The high velocity cold spray, such as that described in U.S. Pat. No. 6,780,458, which is herein incorporated by reference in its entirety, involves a kinetic spray process that uses supersonic jets of compressed gas to accelerate near-room temperature powder particles at ultra high velocities. The unmelted particles, traveling at speeds between 500 to 1,500 m/sec plastically deform and consolidate on impact with their substrate to create a coating. The basis of the cold spray process is the gas-dynamic acceleration of particulates to supersonic velocities (500-1500 m/sec), and hence high kinetic energies, so that solid-state plastic deformation and fusion occur on impact to produce dense coatings without the feedstock material being significantly heated.

The spray-and-fuse process is a two-step process in which a powdered coating material is deposited by using either a combustion gun or plasma spray gun, and subsequently fused to the matrix body substrate using either a heating torch or a furnace, for example, to temperatures ranging from 700-1200° C. depending on the melting point of the overlay material. The coatings are usually made of nickel or cobalt self-fluxing alloys to which hard particles, such as tungsten carbide, may be added for increased wear resistance. A reinforcing overlay having the desired thickness may be formed by building up several layers at a rate of 0.005 to 0.030 inches per pass. Deposit thickness is controlled by the traverse speed of rotation (when done between centers on cylindrical parts), powder flow, and the number of layers applied.

Other methods and techniques for applying hardfacing materials are known in the art and are omitted here for the sake of clarity. It should be noted that while oxyacetylene welding may be a preferred method of applying the improved hardfacing composition disclosed herein, any suitable method may be employed.

Figure 3:
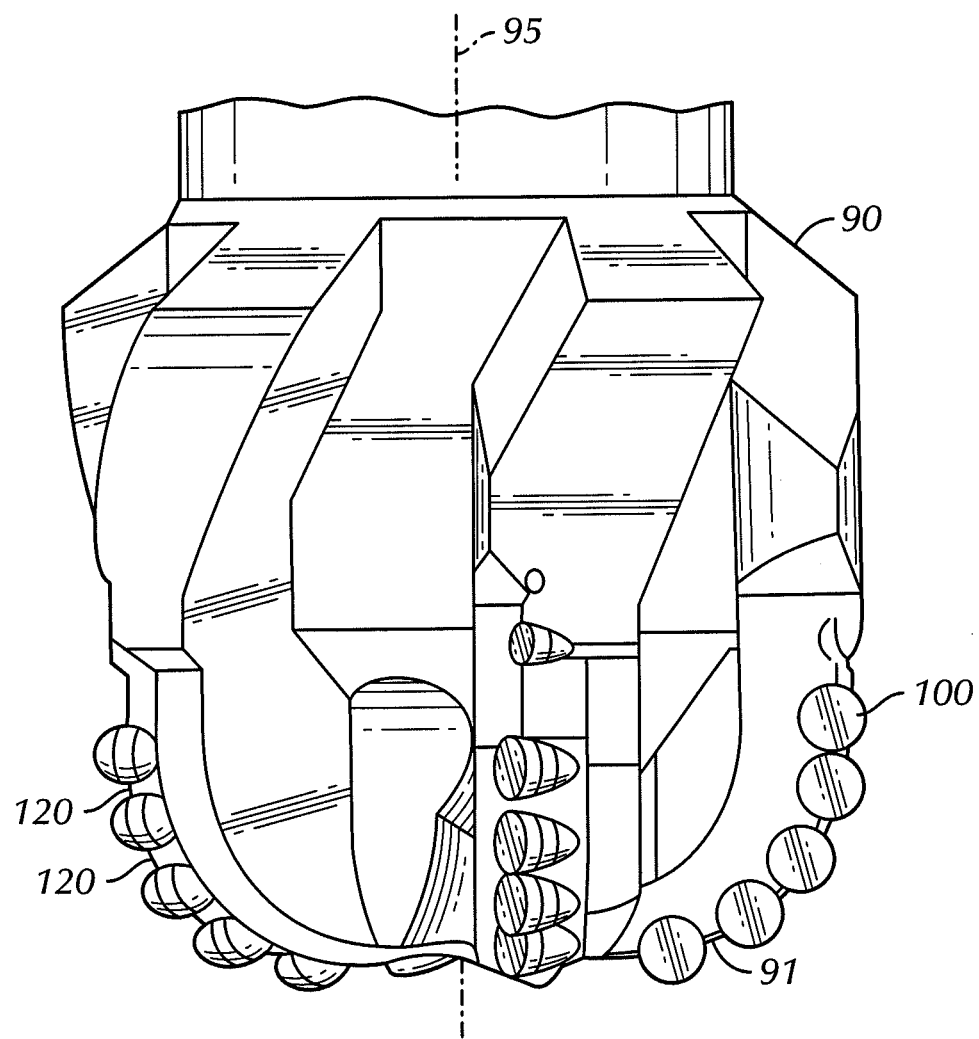
FIG. 3 shows a fixed cutter bit in accordance with the present disclosure.

Further, as stated above, embodiments of the present disclosure apply equally well to fixed cutter bits as to roller cone bits. For example, FIG. 3 shows a drill bit body 90 comprising at least one PDC cutter 100. The drill bit body 90 is formed with at least one blade 91, which extends radially from a central longitudinal axis 95 of the drill bit 90. Bit body 90 may include steel bit bodies, which have conventionally have hardfacing applied thereto, as well as matrix bit bodies, such as described in U.S. patent application Ser. No. 11/650,860, filed on Jan. 8, 2007, which is assigned to the present assignee and herein incorporated by reference in its entirety.

In the present embodiment, the bit body 90 includes a hardfacing layer 120, which includes an abrasive phase formed from abrasive particles and a binder alloy. As with the above, the hardfacing layer 120 may be applied using any technique known in the art, such as "tube," thermal spray, or arc hardfacing. The PDC cutter 100 is disposed on the blade 91. The number of blades 91 and/or cutters 100 is related, among other factors, to the type of formation to be drilled, and can thus be varied to meet particular drilling requirements.

The PDC cutter 100 may be formed from a sintered tungsten carbide composite substrate (not shown separately in FIG. 3) and a polycrystalline diamond compact (not shown separately in FIG. 3), among other materials. The polycrystalline diamond compact and the sintered tungsten carbide substrate may be bonded together using any method known in the art.

Embodiments of the present disclosure may include one or more of the following advantages. Embodiments of the present disclosure may provide a hardfacing composition having an improved toughness. However, not only may the composition have improved toughness and impact properties, but it may have such improved properties without sacrificing wear resistance.

The use of a narrow size distribution of tungsten carbide particles may allow for reduce carbide-carbide contact and a larger mean free path, increasing toughness without sacrificing wear properties. Increased toughness may result from the increased mean free path, while the carbide content (amount of wear particles) may stay approximately the same, giving the same or similar wear resistance while achieving increased toughness. Thus, by using a particular size distribution of particles in a hardfacing composition, the resulting hardfacing layer may be advantageously characterized as possessing toughness and strength without impairing wear and erosion resistance, and thus not susceptible to cracking and wear/erosion. These advantages may lead to improved hardfacings on drill bits and other earth-boring devices in terms of longer bit life.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hardfacing composition consisting essentially of:
from about 50 to 75 percent by weight of a carbide phase having a plurality of carbide particles with a particle size distribution of ±20% or less of a median particle size;
wherein the plurality of carbide particles are of the same chemical composition or of the same shape; and
from about 25 to 50 percent by weight of binder phase.

2. The hardfacing composition of claim 1, wherein the plurality of carbide particles comprise at least one of cast tungsten carbide, cemented tungsten carbide, and macrocrystalline tungsten carbide.

3. The hardfacing composition of claim 2, wherein the plurality of carbide particles comprise at least one of spherical cast tungsten carbide and crushed cast tungsten carbide.

4. The hardfacing composition of claim 1, wherein a mean particle size of the plurality of carbide particles ranges from 50 to 840 microns.

5. A hardfacing composition consisting essentially of:
from about 50 to 75 percent by weight of a carbide phase, wherein 90% of the carbide phase have a plurality of carbide particles with a particle size within 20% or less of a median particle size of the carbide phase;
wherein the plurality of carbide particles are of the same chemical composition or of the same shape; and
from about 25 to 50 percent by weight of binder phase.

6. The matrix powder of claim 5, wherein the plurality of carbide particles comprise at least one cast tungsten carbide, cemented tungsten carbide, and macrocrystalline tungsten carbide.

7. The matrix powder of claim 6, wherein the plurality of carbide particles comprise at least one of spherical cast tungsten carbide and crushed cast tungsten carbide.

8. The matrix powder of claim 5, wherein a mean particle size of the plurality of carbide particles ranges from 50 to 840 microns.

9. A roller cone drill bit, comprising:
a bit body; and
at least one roller cone rotatably mounted to the bit body, the at least one roller cone comprising at least one cutting element, the at least one cutting element having a hardfacing composition on at least an exterior surface, the hardfacing composition consisting essentially of:
a plurality of carbide particles having a particle size distribution of ±20% or less of a median particle size;
wherein the plurality of carbide particles are of the same chemical composition or of the same shape; and
a binder phase.

10. The bit of claim 9, wherein the plurality of carbide particles comprise at least one of cast tungsten carbide, cemented tungsten carbide, and macrocrystalline tungsten carbide.

11. The bit of claim 9, wherein the plurality of carbide particles comprise at least one of spherical cast tungsten carbide and crushed cast tungsten carbide.

12. The bit of claim 9, wherein a mean particle size of the plurality of carbide particles ranges from 50 to 840 microns.

13. A roller cone drill bit, comprising:
a bit body; and
at least one roller cone rotatably mounted to the bit body, the at least one roller cone comprising at least one cutting element, the at least one cutting element having a hardfacing on at least an exterior surface, the hardfacing comprising a plurality of carbide particles separated by a binder phase, wherein the plurality of carbide particles have a mean free path of at least 40 microns, and wherein the plurality of carbide particles are of the same chemical composition or of the same shape.

14. The bit of claim 13, wherein a mean particle size of the plurality of carbide particles ranges from 50 to 840 microns.

15. The bit of claim 13, wherein the plurality of carbide particles having a particle size distribution of ±20% or less of a median particle size.

16. The bit of claim 13, wherein the binder phase comprises from about 25 to 50 percent by weight of the hardfacing.

17. A drill bit, comprising:
a bit body having at least one blade thereon;
at least one cutter pocket disposed on the at least one blade;
at least one cutter disposed in the at least one cutter pocket; and
a hardfacing disposed on at least an exterior surface of the bit body, the hardfacing composition consisting essentially of:
a plurality of carbide particles having a particle size distribution of ±20% or less of a median particle size, wherein the plurality of carbide particles are of the same chemical composition or of the same shape; and
a binder phase.

18. The bit of claim 17, wherein the plurality of carbide particles comprise at least one of cast tungsten carbide, cemented tungsten carbide, and macrocrystalline tungsten carbide.

19. The bit of claim 17, wherein the plurality of carbide particles comprise at least one of spherical cast tungsten carbide and crushed cast tungsten carbide.

20. The bit of claim 17, wherein a mean particle size of the plurality of carbide particles ranges from 50 to 840 microns.

21. A drill bit, comprising:
a bit body having at least one blade thereon;
at least one cutter pocket disposed on the at least one blade;
at least one cutter disposed in the at least one cutter pocket; and
a hardfacing disposed on at least an exterior surface of the bit body, the hardfacing comprising a plurality of carbide particles separated by a binder phase, wherein the plurality of carbide particles have a mean free path of at least 40 microns, and wherein the plurality of carbide particles are of the same chemical composition or of the same shape.

22. The bit of claim 21, wherein a mean particle size of the plurality of carbide particles ranges from 50 to 840 microns.

23. The bit of claim 21, wherein the plurality of carbide particles having a particle size distribution of ±20% or less of a median particle size.

24. The bit of claim 21, wherein the binder phase comprises from about 25 to 50 percent by weight of the hardfacing.

* * * * *